(12) United States Patent
Kato et al.

(10) Patent No.: US 9,758,162 B2
(45) Date of Patent: Sep. 12, 2017

(54) HYBRID VEHICLE, CONTROLLER FOR HYBRID VEHICLE, AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Toshikazu Kato, Toyota (JP); Ryuta Teraya, Okazaki (JP); Yoshikazu Asami, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/023,272

(22) PCT Filed: Sep. 17, 2014

(86) PCT No.: PCT/IB2014/001862
§ 371 (c)(1),
(2) Date: Mar. 18, 2016

(87) PCT Pub. No.: WO2015/040472
PCT Pub. Date: Mar. 26, 2015

(65) Prior Publication Data
US 2016/0264129 A1  Sep. 15, 2016

(30) Foreign Application Priority Data

Sep. 20, 2013 (JP) .................. 2013-194781

(51) Int. Cl.
*B60L 9/00* (2006.01)
*B60W 20/40* (2016.01)
(Continued)

(52) U.S. Cl.
CPC ............ *B60W 20/40* (2013.01); *B60K 6/442* (2013.01); *B60K 6/445* (2013.01); *B60W 10/06* (2013.01);
(Continued)

(58) Field of Classification Search
CPC .... B60W 20/40; B60W 10/06; B60W 30/192; B60W 2520/10; B60W 2710/0633;
(Continued)

(56) References Cited

U.S. PATENT DOCUMENTS 6,026,921 A * 2/2000 Aoyama .................. B60K 6/48
123/348
7,546,821 B2 * 6/2009 Russell .................... F01L 13/04
123/90.12

(Continued)

FOREIGN PATENT DOCUMENTS

JP         9-242519      9/1997
JP         2000-34913    2/2000
(Continued)

*Primary Examiner* — Behrang Badii
*Assistant Examiner* — Daniel L Greene
(74) *Attorney, Agent, or Firm* — Finnegan, Henderson, Farabow, Garrett & Dunner, LLP

(57) ABSTRACT

A hybrid vehicle includes an internal combustion engine and a rotary electric machine. The internal combustion engine includes a variable valve actuating device configured to change an operation characteristic of an intake valve. The rotary electric machine is configured to generate driving force for propelling the hybrid vehicle. A controller for the hybrid vehicle includes a traveling control unit and a valve actuation control unit. The traveling control unit executes traveling control for causing the hybrid vehicle to travel by using the driving force of the rotary electric machine while stopping the internal combustion engine. The traveling control unit starts up the internal combustion engine while executing the traveling control. The valve actuation control unit controls the variable valve actuating device. The valve actuation control unit, when the internal combustion engine is started up while the traveling control is executed, sets at least one of a valve lift and valve operating angle of the intake valve such that the at least one of the valve lift and
(Continued)

valve operating angle of the intake valve when the hybrid vehicle travels at a first vehicle speed is smaller than the corresponding at least one of the valve lift and valve operating angle of the intake valve when the hybrid vehicle travels at a second vehicle speed. The second vehicle speed is lower than the first vehicle speed.

11 Claims, 10 Drawing Sheets

(51) Int. Cl.
| | | |
|---|---|---|
| *B60K 6/445* | (2007.10) | |
| *B60W 10/06* | (2006.01) | |
| *B60W 30/192* | (2012.01) | |
| *B60K 6/442* | (2007.10) | |
| *F01L 1/04* | (2006.01) | |
| *F01L 13/00* | (2006.01) | |

(52) U.S. Cl.
CPC ....... *B60W 30/192* (2013.01); *B60W 2520/10* (2013.01); *B60W 2710/0633* (2013.01); *B60Y 2200/92* (2013.01); *B60Y 2300/182* (2013.01); *B60Y 2300/192* (2013.01); *B60Y 2300/437* (2013.01); *F01L 1/044* (2013.01); *F01L 13/0063* (2013.01); *Y02T 10/6239* (2013.01); *Y10S 903/93* (2013.01)

(58) Field of Classification Search
CPC ................ B60K 6/442; B60Y 2200/92; B60Y 2300/182; B60Y 2300/192; B60Y 2300/437; F01L 1/044; F01L 13/0063; Y02T 10/6239; Y10S 903/93
See application file for complete search history.

(56) References Cited

U.S. PATENT DOCUMENTS

| | | | |
|---|---|---|---|
| 7,703,424 B2* | 4/2010 | Nakamura | ............ F01L 1/3442 |
| | | | 123/346 |
| 7,748,353 B2* | 7/2010 | Russell | .................... B60K 6/12 |
| | | | 123/90.12 |
| 8,392,091 B2* | 3/2013 | Hebbale | ..................... F01N 9/00 |
| | | | 60/274 |
| 2004/0118367 A1 | 6/2004 | Ezaki et al. | |
| 2010/0262322 A1 | 10/2010 | Yokouchi et al. | |
| 2012/0132163 A1 | 5/2012 | Shoji et al. | |
| 2013/0306012 A1 | 11/2013 | Hamamoto et al. | |

FOREIGN PATENT DOCUMENTS

| | | |
|---|---|---|
| JP | 2002-61522 | 2/2002 |
| JP | 2004-183610 | 7/2004 |
| JP | 2006-342787 | 12/2006 |
| JP | 2008-25550 | 2/2008 |
| JP | 2010-285038 | 12/2010 |
| JP | 2012-35783 | 2/2012 |
| JP | 2012-117376 | 6/2012 |
| JP | 2013-53610 | 3/2013 |
| WO | WO 2012/105509 A1 | 8/2012 |

* cited by examiner

HYBRID VEHICLE, CONTROLLER FOR HYBRID VEHICLE, AND CONTROL METHOD FOR HYBRID VEHICLE

CROSS-REFERENCE TO RELATED APPLICATIONS

This application is a national phase application of International Application No. PCT/IB2014/001862, filed Sep. 17, 2014, and claims the priority of Japanese Application No. 2013-194781, filed Sep. 20, 2013, the content of both of which are incorporated herein by reference.

BACKGROUND OF THE INVENTION

1. Field of the Invention

The invention relates to a hybrid vehicle, a controller for a hybrid vehicle, and a control method for a hybrid vehicle and, more particularly, to control over a hybrid vehicle including an internal combustion engine.

2. Description of Related Art

Generally, there is known a variable valve actuating device for changing the operation characteristic of an intake valve of an internal combustion engine. There is a variable valve actuating device configured to be able to change at least one of the valve lift and valve operating angle of an intake valve (see, for example, Japanese Patent Application Publication No. 2004-183610 (JP 2004-183610 A), Japanese Patent Application Publication No. 2013-53610 (JP 2013-53610 A), Japanese Patent Application Publication No. 2008-25550 (JP 2008-25550 A), Japanese Patent Application Publication No. 2012-117376 (JP 2012-117376 A) and Japanese Patent Application Publication No. 9-242519 (JP 9-242519 A)). It is possible to change the operating characteristic of the internal combustion engine with the variable valve actuating device.

For example, JP 2000-34913 A describes that, in a vehicle including a variable valve actuating device, an internal combustion engine is automatically started up and stopped during a stop of the vehicle. The vehicle causes decompression to occur by changing the valve lift of an intake valve to a maximum valve lift with the variable valve actuating device at start-up of the internal combustion engine. As a result, it is possible to suppress vibrations that occur at start-up of the internal combustion engine.

SUMMARY OF THE INVENTION

The hybrid vehicle may travel by using only the driving force of a driving rotary electric machine while stopping the internal combustion engine. While the hybrid vehicle travels in such a mode, when the driving force of the internal combustion engine is required on the basis of a traveling condition, the internal combustion engine is started up while the vehicle travels. However, if the valve lift of the intake valve is increased in order to suppress vibrations, the response of torque that is generated by the internal combustion engine decreases, so there is a possibility that it is not possible to immediately output torque that is required of the internal combustion engine.

The invention provides a hybrid vehicle that achieves appropriate engine start-up on the basis of a traveling condition, a controller for the hybrid vehicle, and a control method for the hybrid vehicle.

A first aspect of the invention provides a controller for a hybrid vehicle. The hybrid vehicle includes an internal combustion engine and a rotary electric machine. The internal combustion engine includes a variable valve actuating device configured to change an operation characteristic of an intake valve. The rotary electric machine is configured to generate driving force for propelling the hybrid vehicle. The controller includes a traveling control unit and a valve actuation control unit. The traveling control unit is configured to execute traveling control for causing the hybrid vehicle to travel by using the driving force of the rotary electric machine while stopping the internal combustion engine. The traveling control unit is configured to start up the internal combustion engine while executing the traveling control. The valve actuation control unit is configured to control the variable valve actuating device. The valve actuation control unit is configured to, when the internal combustion engine is started up while the traveling control is executed, set at least one of a valve lift and valve operating angle of the intake valve such that the at least one of the valve lift and valve operating angle of the intake valve when the hybrid vehicle travels at a first vehicle speed is smaller than the corresponding at least one of the valve lift and valve operating angle of the intake valve when the hybrid vehicle travels at a second vehicle speed. The second vehicle speed is lower than the first vehicle speed.

In the above aspect, when start-up of the internal combustion engine is required while the traveling control is executed, the valve actuation control unit may be configured to set at least one of the valve lift of the intake valve and the valve operating angle of the intake valve such that the at least one of the valve lift of the intake valve and the valve operating angle of the intake valve when the hybrid vehicle travels at the first vehicle speed is smaller than the corresponding at least one of the valve lift of the intake valve and the valve operating angle of the intake valve when the hybrid vehicle travels at the second vehicle speed, and the traveling control unit may be configured to start up the internal combustion engine.

In the above aspect, the variable valve actuating device may be configured to change the operation characteristic of the intake valve to one of a first characteristic and a second characteristic. At least one of the valve lift and the valve operating angle of the second characteristic may be larger than the corresponding at least one of the valve lift and the valve operating angle of the first characteristic. The valve actuation control unit may be configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value. The valve actuation control unit may be configured to set the operation characteristic of the intake valve to the second characteristic when start-up of the internal combustion engine is required while the traveling control is executed and when the speed of the hybrid vehicle at the time when start-up of the internal combustion engine is required is lower than the predetermined value. The traveling control unit may be configured to start up the internal combustion engine when start-up of the internal combustion engine is required while the traveling control is executed.

In the above aspect, the variable valve actuating device may be configured to change the operation characteristic of the intake valve to any one of a first characteristic, a second characteristic and a third characteristic. At least one of the valve lift and the valve operating angle of the second characteristic may be larger than the corresponding at least one of the valve lift and the valve operating angle of the first characteristic. At least one of the valve lift and the valve operating angle of the third characteristic may be larger than the corresponding at least one of the valve lift and the valve operating angle of the second characteristic. The valve actuation control unit may be configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value. The valve actuation control unit may be configured to set the operation characteristic of the intake valve to the third characteristic when start-up of the internal combustion engine is required while the traveling control is executed and when the speed of the hybrid vehicle at the time when start-up of the internal combustion engine is required is lower than the predetermined value. The traveling control unit may be configured to start up the internal combustion engine when start-up of the internal combustion engine is required while the traveling control is executed.

In the above aspect, when start-up of the internal combustion engine is required while the traveling control is executed, the valve actuation control unit may be configured to reduce at least one of the valve lift and valve operating angle of the intake valve as a speed of the hybrid vehicle increases. The traveling control unit may be configured to start up the internal combustion engine when start-up of the internal combustion engine is required while the traveling control is executed.

Another aspect of the invention provides a control method for a hybrid vehicle. The hybrid vehicle includes an internal combustion engine, a rotary electric machine, and a controller. The internal combustion engine includes a variable valve actuating device configured to change an operation characteristic of an intake valve. The rotary electric machine is configured to generate driving force for propelling the hybrid vehicle. The control method includes: (a) executing traveling control by the controller, the traveling control being control for causing the hybrid vehicle to travel by using the driving force of the rotary electric machine while stopping the internal combustion engine; (b) when the internal combustion engine is started up while the traveling control is executed, setting, by the controller, at least one of a valve lift and valve operating angle of the intake valve such that the at least one of the valve lift and valve operating angle of the intake valve when the hybrid vehicle travels at a first vehicle speed is smaller than the corresponding at least one of the valve lift and valve operating angle of the intake valve when the hybrid vehicle travels at a second vehicle speed, the second vehicle speed being lower than the first vehicle speed; and (c) starting the internal combustion engine by the controller when start-up of the internal combustion engine is required while the traveling control is executed.

Further another aspect of the invention provides a hybrid vehicle. The hybrid vehicle includes an internal combustion engine, a rotary electric machine, and a controller. The internal combustion engine includes a variable valve actuating device configured to change an operation characteristic of an intake valve. The rotary electric machine is configured to generate driving force for propelling the hybrid vehicle. The controller is configured to: (a) execute traveling control for causing the hybrid vehicle to travel by using the driving force of the rotary electric machine while stopping the internal combustion engine, (b) control the variable valve actuating device, and (c) when the internal combustion engine is started up while the traveling control is executed, set at least one of a valve lift and valve operating angle of the intake valve such that the at least one of the valve lift and valve operating angle of the intake valve when the hybrid vehicle travels at a first vehicle speed is smaller than the corresponding at least one of the valve lift and valve operating angle of the intake valve when the hybrid vehicle travels at a second vehicle speed, the second vehicle speed being lower than the first vehicle speed, and start up the internal combustion engine.

In the above aspect, when start-up of the internal combustion engine is required while the traveling control is executed, the controller may be configured to set at least one of the valve lift of the intake valve and the valve operating angle of the intake valve such that the at least one of the valve lift of the intake valve and the valve operating angle of the intake valve when the hybrid vehicle travels at the first vehicle speed is smaller than the corresponding at least one of the valve lift of the intake valve and the valve operating angle of the intake valve when the hybrid vehicle travels at the second vehicle speed, and start up the internal combustion engine.

In the above aspect, the variable valve actuating device may be configured to change the operation characteristic of the intake valve to one of a first characteristic and a second characteristic. At least one of the valve lift and the valve operating angle of the second characteristic may be larger than the corresponding at least one of the valve lift and the valve operating angle of the first characteristic. The controller may be configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value. The controller may be configured to set the operation characteristic of the intake valve to the second characteristic when start-up of the internal combustion engine is required while the traveling control is executed and when the speed of the hybrid vehicle at the time when start-up of the internal combustion engine is required is lower than the predetermined value. The controller may be configured to start up the internal combustion engine when start-up of the internal combustion engine is required while the traveling control is executed.

In the above aspect, the variable valve actuating device may be configured to change the operation characteristic of the intake valve to any one of a first characteristic, a second characteristic and a third characteristic. At least one of the valve lift and the valve operating angle of the second characteristic may be larger than the corresponding at least one of the valve lift and the valve operating angle of the first characteristic. At least one of the valve lift and the valve operating angle of the third characteristic may be larger than the corresponding at least one of the valve lift and the valve operating angle of the second characteristic. The controller may be configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value. The controller may be configured to set the operation characteristic of the intake valve to the third characteristic when start-up of the internal combustion engine is required while the traveling control is executed and when the speed of the hybrid vehicle at the time when start-up of the internal combustion engine is required is lower than the predetermined value. The controller may be configured to start up the internal combustion engine when start-up of the internal combustion engine is required while the traveling control is executed.

In the above aspect, when start-up of the internal combustion engine is required while the traveling control is executed, the controller may be configured to reduce at least one of the valve lift and valve operating angle of the intake valve as a speed of the hybrid vehicle increases. The controller may be configured to start up the internal combustion engine when start-up of the internal combustion engine is required while the traveling control is executed.

According to the invention, when the speed of the hybrid vehicle is high, the engine is started up while at least one of the valve lift and the valve operating angle is reduced. Thus, the response of engine torque increases, so it is possible to immediately output engine torque. On the other hand, when the speed of the hybrid vehicle is low, the engine is started up while at least one of the valve lift and the valve operating angle is increased. Thus, decompression occurs, so it is possible to suppress vibrations resulting from an engine start-up. Thus, according to the invention, it is possible to achieve appropriate engine start-up on the basis of the traveling condition.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
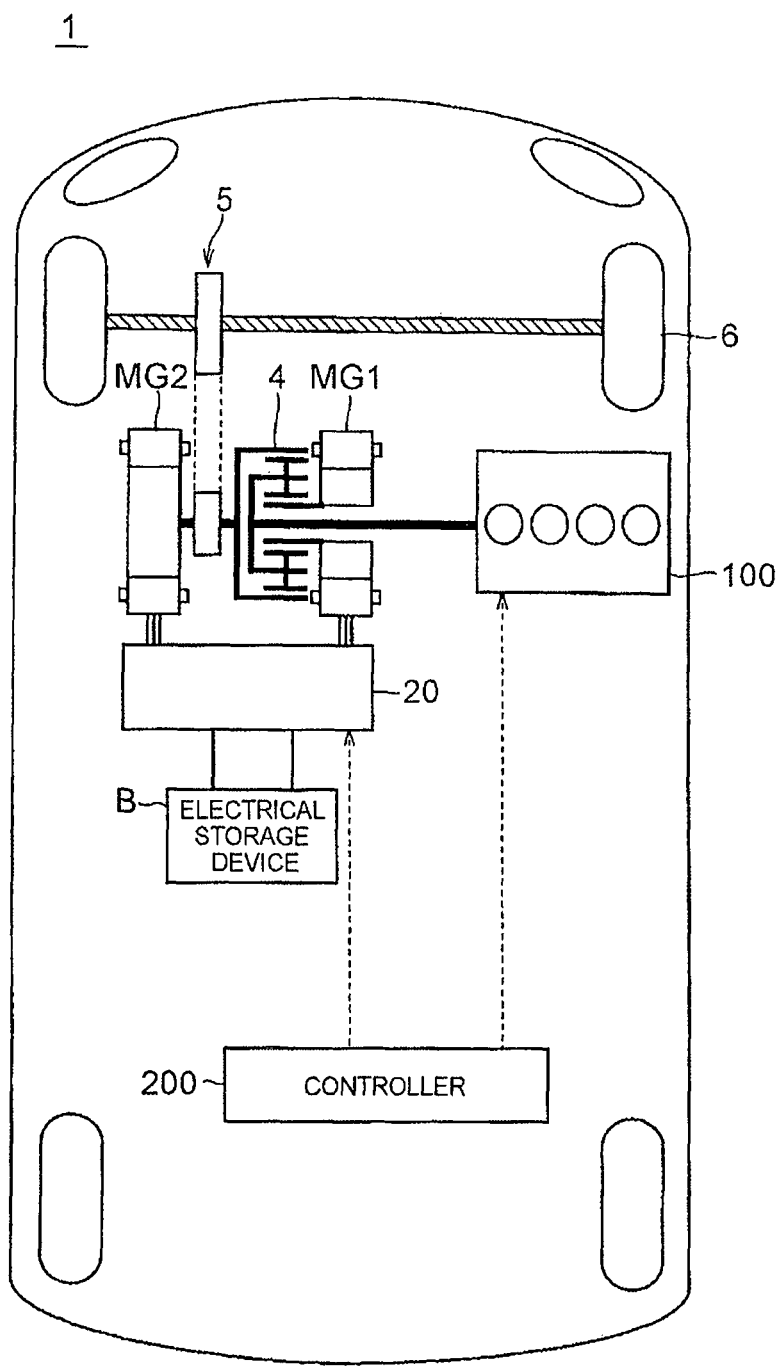
FIG. 1 is a block diagram that shows the overall configuration of a hybrid vehicle to which a controller according to an embodiment of the invention is applied.

Hereinafter, embodiments of the invention will be described in detailed with reference to the accompanying drawings. Like reference numerals denote the same or corresponding portions in the drawings, and the description thereof will not be repeated.

FIG. 1 is a block diagram that shows the overall configuration of a hybrid vehicle to which a controller according to an embodiment of the invention is applied. As shown in FIG. 1, the hybrid vehicle 1 includes an engine 100, motor generators MG1, MG2, a power split device 4, a reduction gear 5, drive wheels 6, an electrical storage device B, a power control unit (PCU) 20, and a controller 200.

The hybrid vehicle 1 travels by using driving force that is output from at least one of the engine 100 and the motor generator MG2. Driving force that is generated by the engine 100 is split by the power split device 4 into two paths. One of the paths is a path through which driving force is transmitted to the drive wheels 6 via the reduction gear 5. The other one of the paths is a path through which driving force is transmitted to the motor generator MG1.

The electrical storage device 13 is an electric power storage element configured to be rechargeable and dischargeable. The electrical storage device B includes a secondary battery, such as a lithium ion battery, a nickel-metal hydride battery and a lead storage battery, or a cell of an electrical storage element, such as an electric double layer capacitor.

The electrical storage device B is connected to the PCU 20 for driving the motor generators MG1, MG2. The electrical storage device B supplies the PCU 20 with electric power for generating the driving force of the hybrid vehicle 1. The electrical storage device B stores electric power generated by the motor generators MG1, MG2. The output of the electrical storage device B is, for example, 200 V.

The PCU 20 converts direct-current power, which is supplied from the electrical storage device B, to alternating-current power, and drives the motor generators MG1, MG2 by using the alternating-current power. The PCU 20 converts alternating-current power, generated by the motor generators MG1, MG2, to direct-current power, and charges the electrical storage device B with the direct-current power.

The controller 200 calculates a traveling power on the basis of an accelerator operation amount signal and a traveling state of the vehicle. The accelerator operation amount signal indicates an operation amount of an accelerator pedal. The controller 200 controls the driving force of the engine 100 and the driving force of the motor generator MG2 on the basis of the calculated traveling power. The controller 200 controls the drive mode of the hybrid vehicle 1 on the basis of the traveling power. The drive mode includes an "EV mode" and an "HV mode". In the "EV mode", the hybrid vehicle 1 travels by using the motor generator MG2 as a power source in a state where the engine 100 is stopped. In the "HV mode", the hybrid vehicle 1 travels in a state where the engine 100 is operated.

Figure 2:
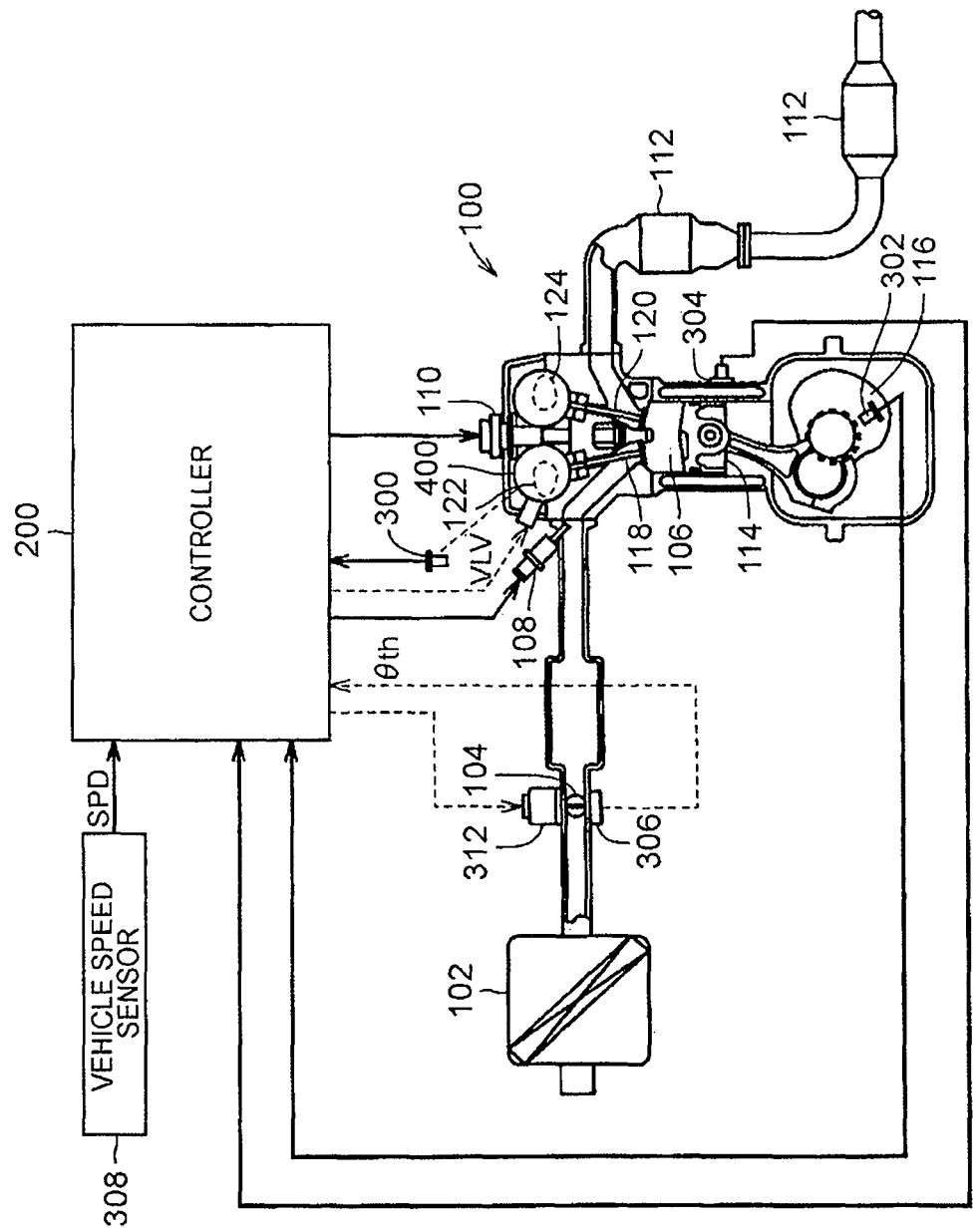
FIG. 2 is a view that shows the configuration of an engine shown in FIG. 1.

FIG. 2 is a view that shows the configuration of the engine 100 shown in FIG. 1. As shown in FIG. 2, air is taken into the engine 100 through an air cleaner 102. An intake air amount is adjusted by a throttle valve 104. The throttle valve 104 is an electrically controlled throttle valve that is driven by a throttle motor 312.

Each injector 108 injects fuel toward a corresponding intake port. Air mixed with fuel in each intake port is introduced into a corresponding cylinder 106.

In the present embodiment, the engine 100 will be described as a port injection-type engine in which an injection hole of each injector 108 is provided in the corresponding intake port. In addition to each port injection injector 108, a direct injection injector that directly injects fuel into the corresponding cylinder 106 may be provided. Furthermore, only a direct injection injector may be provided.

Air-fuel mixture in each cylinder 106 is ignited by an ignition plug 110 to combust. The combusted air-fuel mixture, that is, exhaust gas, is purified by a three-way catalyst 112, and is then emitted to the outside of the vehicle. A piston 114 is pushed downward by combustion of air-fuel mixture, and a crankshaft 116 rotates.

An intake valve 118 and an exhaust valve 120 are provided at the top portion of each cylinder 106. The amount of air that is introduced into each cylinder 106 and the timing of introduction are controlled by the corresponding intake valve 118. The amount of exhaust gas that is emitted from each cylinder 106 and the timing of emission are controlled by the corresponding exhaust valve 120. Each intake valve 118 is driven by a cam 122. Each exhaust valve 120 is driven by a cam 124.

As will be described in detail later, the valve lift and valve operating angle of each intake valve 118 are controlled by a variable valve lift (VVL) device 400. The valve lift and valve operating angle of each exhaust valve 120 may also be controlled. A variable valve timing (VVT) device that controls the open/close timing may be combined with the VVL device 400.

The controller 200 controls a throttle opening degree 0th, an ignition timing, a fuel injection timing, a fuel injection amount, and the operating state (open/close timing, valve lift, valve operating angle, and the like) of each intake valve so that the engine 100 is placed in a desired operating state. Signals are input to the controller 200 from various sensors, that is, a cam angle sensor 300, a crank angle sensor 302, a knock sensor 304, a throttle opening degree sensor 306 and a vehicle speed sensor 308.

The cam angle sensor 300 outputs a signal indicating a cam position. The crank angle sensor 302 outputs signals indicating the rotation speed of the crankshaft 116 (engine rotation speed) and the rotation angle of the crankshaft 116. The knock sensor 304 outputs a signal indicating the strength of vibrations of the engine 100. The throttle opening degree sensor 306 outputs a signal indicating the throttle opening degree 0th. The vehicle speed sensor 308 is used to detect the traveling speed of the hybrid vehicle 1. As an example, the vehicle speed sensor 308 detects the traveling speed by measuring the rotation speed of a drive shaft of the hybrid vehicle 1. The vehicle speed sensor 308 outputs a signal SPD to the controller 200. The signal SPD indicates the traveling speed. The controller 200 may calculate a traveling speed on the basis of the detected value of the vehicle speed sensor 308.

Figure 3:
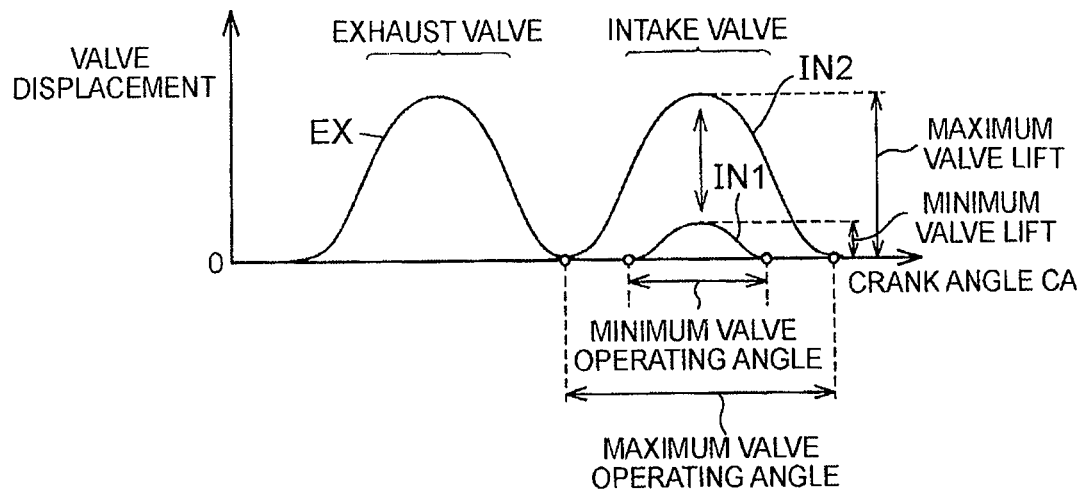
FIG. 3 is a graph that shows the correlation between a crank angle and a valve displacement that is achieved by a VVL (Variable Valve Lift) device.

FIG. 3 is a graph that shows the correlation between a crank angle and a valve displacement that is achieved by the VVL device 400. As shown in FIG. 3, each exhaust valve 120 opens and closes in an exhaust stroke, and each intake valve 118 opens and closes in an intake stroke. The valve displacement of each exhaust valve 120 is indicated by a waveform EX. The valve displacements of each intake valve 118 is indicated by waveforms IN1, IN2.

The valve displacement is a displacement of each intake valve 118 from a state where the intake valve 118 is closed. The valve lift is a valve displacement at the time when the opening degree of each intake valve 118 has reached a peak. The valve operating angle is a crank angle of a period from when each intake valve 118 opens to when the intake valve 118 closes.

The operation characteristic of each intake valve 118 is changed by the VVL device 400 between the waveforms IN1, IN2. The waveform IN1 indicates the case where the valve lift and the valve operating angle are minimum. The waveform IN2 indicates the case where the valve lift and the valve operating angle are maximum. In the VVL device 400, the valve operating angle increases with an increase in the valve lift.

Figure 4:
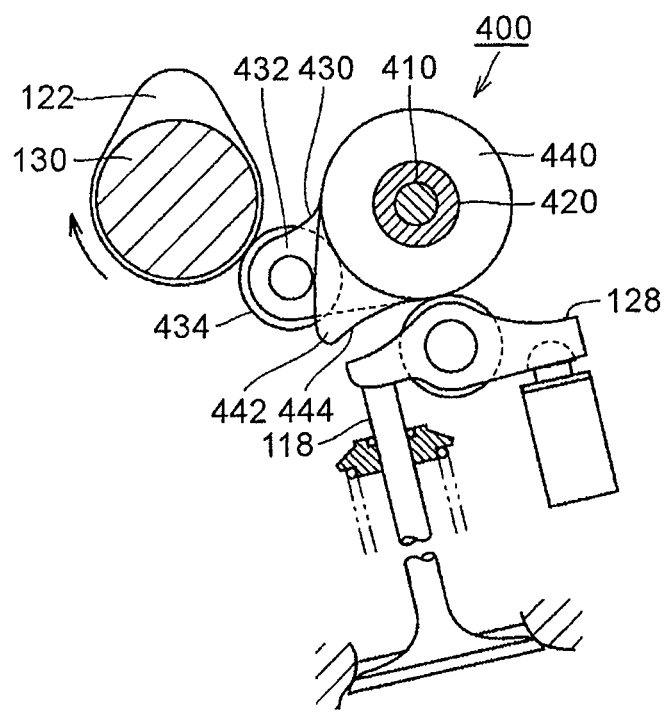
FIG. 4 is a front view of the VVL device that is an example of a device that controls the valve lift and valve operating angle of each intake valve.

FIG. 4 is a front view of the VVL device 400 that is one example of a device that controls the valve lift and valve operating angle of each intake valve 118. As shown in FIG. 4, the VVL device 400 includes a drive shaft 410, a support pipe 420, an input arm 430, and oscillation cams 440. The drive shaft 410 extends in one direction. The support pipe 420 covers the outer periphery of the drive shaft 410. The input arm 430 and the oscillation cams 440 are arranged in the axial direction of the drive shaft 410 on the outer periphery of the support pipe 420. An actuator (not shown) that linearly actuates the drive shaft 410 is connected to the distal end of the drive shaft 410.

The VVL device 400 includes the single input arm 430 in correspondence with the single cam 122 provided in each cylinder. The two oscillation cams 440 are provided on both sides of each input arm 430 in correspondence with the pair of intake valves 118 provided for each cylinder.

The support pipe 420 is formed in a hollow cylindrical shape, and is arranged parallel to a camshaft 130. The support pipe 420 is fixed to a cylinder head so as not to be moved in the axial direction or rotated.

The drive shaft 410 is inserted inside the support pipe 420 so as to be slidable in the axial direction. The input arm 430 and the two oscillation cams 440 are provided on the outer periphery of the support pipe 420 so as to be oscillatable about the axis of the drive shaft 410 and not to move in the axial direction.

The input arm 430 includes an arm portion 432 and a roller portion 434. The arm portion 432 protrudes in a direction away from the outer periphery of the support pipe 420. The roller portion 434 is rotatably connected to the distal end of the arm portion 432. The input arm 430 is provided such that the roller portion 434 is arranged at a position at which the roller portion 434 is able to contact the cam 122.

Each oscillation cam 440 has a substantially triangular nose portion 442 that protrudes in a direction away from the outer periphery of the support pipe 420. A concave cam face 444 is formed at one side of the nose portion 442. A roller rotatably attached to a rocker arm 128 is pressed against the cam face 444 by the urging force of a valve spring provided in the intake valve 118.

The input arm 430 and the oscillation cams 440 integrally oscillate about the axis of the drive shaft 410. Therefore, as the camshaft 130 rotates, the input arm 430 that is in contact with the cam 122 oscillates, and the oscillation cams 440 oscillate in interlocking with movement of the input arm 430. The movements of the oscillation cams 440 are transferred to the intake valves 118 via rocker arms 128, and the intake valves 118 are opened or closed.

The VVL device 400 further includes a device that changes a relative phase difference between the input arm 430 and each oscillation cam 440 around the axis of the support pipe 420. The valve lift and valve operating angle of each intake valve 118 are changed as needed by the device that changes the relative phase difference.

That is, when the relative phase difference between the input arm 430 and each oscillation cam 440 is increased, the oscillation angle of each rocker arm 128 is increased with respect to the oscillation angle of each of the input arm 430 and the oscillation cams 440, and the valve lift and valve operating angle of each intake valve 118 are increased.

When the relative phase difference between the input arm 430 and each oscillation cam 440 is reduced, the oscillation angle of each rocker arm 128 is reduced with respect to the oscillation angle of each of the input arm 430 and the oscillation cams 440, and the valve lift and valve operating angle of each intake valve 118 are reduced.

Figure 5:
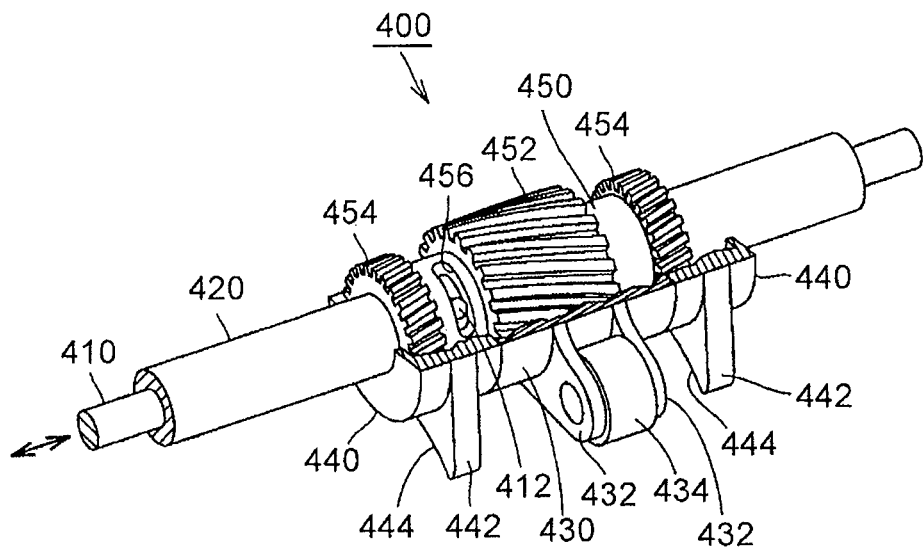
FIG. 5 is a perspective view that partially shows the VVL device.

FIG. 5 is a perspective view that partially shows the VVL device 400. FIG. 5 shows a structure with part cut away so that the internal structure is clearly understood.

As shown in FIG. 5, a slider gear 450 is accommodated in a space defined between the outer periphery of the support pipe 420 and the set of input arm 430 and two oscillation cams 440. The slider gear 450 is supported on the support pipe 420 so as to be rotatable and slidable in the axial direction. The slider gear 450 is provided on the support pipe 420 so as to be slidable in the axial direction.

The slider gear 450 includes a helical gear 452. The helical gear 452 is located at the center portion of the slider gear 450 in the axial direction. Right-handed screw spiral helical splines are formed on the helical gear 452. The slider gear 450 includes helical gears 454. The helical gears 454 are respectively located on both sides of the helical gear 452. Left-handed screw spiral helical splines opposite to those of the helical gear 452 are formed on each of the helical gears 454.

On the other hand, helical splines corresponding to the helical gears 452, 454 are respectively formed on the inner peripheries of the input arm 430 and two oscillation cams 440. The inner peripheries of the input arm 430 and two oscillation cams 440 define a space in which the slider gear 450 is accommodated. That is, the right-handed spiral helical splines are formed on the input arm 430, and the helical splines are in mesh with the helical gear 452. The left-handed spiral helical splines are formed on each of the oscillation cams 440, and the helical splines are in mesh with the corresponding helical gear 454.

An oblong hole 456 is formed in the slider gear 450. The oblong hole 456 is located between the helical gear 452 and one of the helical gears 454, and extends in the circumferential direction. Although not shown in the drawing, an oblong hole is formed in the support pipe 420, and the oblong hole extends in the axial direction so as to partially overlap with the oblong hole 456. A locking pin 412 is integrally provided in the drive shaft 410 inserted inside the support pipe 420. The locking pin 412 protrudes through the overlapped portions of these oblong hole 456 and oblong hole (not shown).

When the drive shaft 410 is moved in the axial direction by the actuator (not shown) coupled to the drive shaft 410, the slider gear 450 is pressed by the locking pin 412, and the helical gears 452, 454 move in the axial direction of the drive shaft 410 at the same time. When the helical gears 452, 454 are moved in this way, the input arm 430 and the oscillation cams 440 spline-engaged with these helical gears 452, 454 do not move in the axial direction. Therefore, the input arm 430 and the oscillation cams 440 pivot around the axis of the drive shaft 410 through meshing of the helical splines.

At this time, the helical splines respectively formed on the input arm 430 and each oscillation cam 440 have opposite orientations. Therefore, the pivot direction of the input arm 430 and the pivot direction of each oscillation cam 440 are opposite to each other. Thus, the relative phase difference between the input arm 430 and each oscillation cam 440 changes, with the result that the valve lift and valve operating angle of each intake valve 118 are changed as is already described. The VVL device is not limited to this type. For example, a VVL device that electrically drives each valve, a VVL device that hydraulically drives each valve, or the like, may be used.

The controller 200 controls the valve lift and valve operating angle of each intake valve 118 by adjusting an operation amount of the actuator that linearly moves the drive shaft 410.

Figure 6:
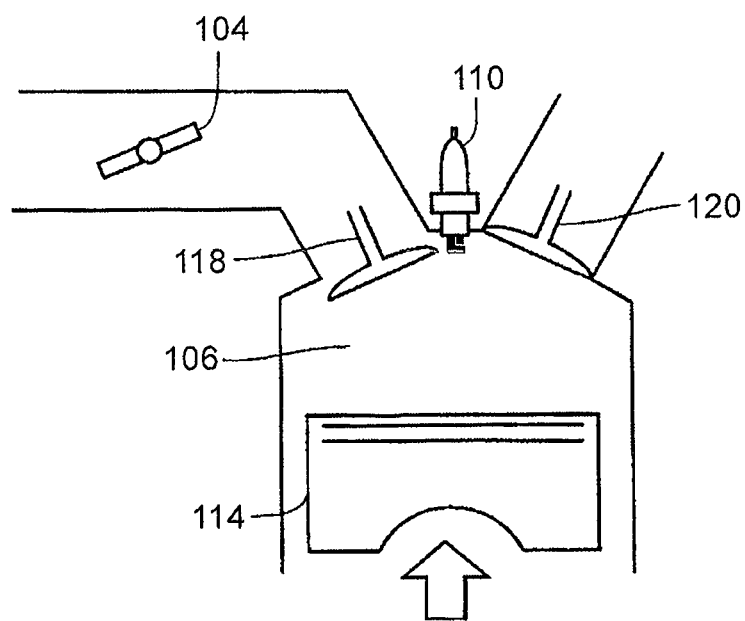
FIG. 6 is a view that illustrates an operation at the time when the valve lift and valve operating angle of each intake valve are large.
Figure 7:
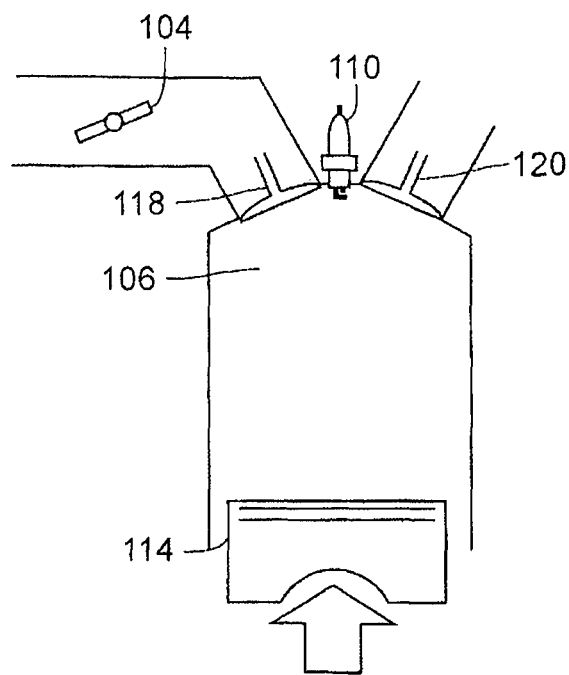
FIG. 7 is a view that illustrates an operation at the time when the valve lift and valve operating angle of each intake valve are small.

FIG. 6 is a view that illustrates an operation at the time when the valve lift and valve operating angle of each intake valve 118 are large. FIG. 7 is a view that illustrates an operation at the time when the valve lift and valve operating angle of each intake valve 118 are small. As shown in FIG. 6 and FIG. 7, when the valve lift and valve operating angle of each intake valve 118 are large, because the close timing of each intake valve 118 delays, the engine 100 runs on the Atkinson cycle. That is, part of air taken into the cylinder 106 in the intake stroke is returned to the outside of the cylinder 106, so compression reaction that is a force for compressing air decreases in the compression stroke. Thus, it is possible to reduce vibrations at engine start-up. However, because the compression ratio decreases, ignitability deteriorates.

On the other hand, when the valve lift and valve operating angle of each intake valve 118 are small, because the close timing of each intake valve 118 advances, the compression ratio increases. Therefore, it is possible to improve ignitability at a low temperature. However, because the compression reaction increases, vibrations at engine start-up increase. Engine brake increases because of an increase in pumping loss. When the valve lift and valve operating angle of the intake valve 118 are small, the response of engine torque improves as will be described below.

Figure 8:
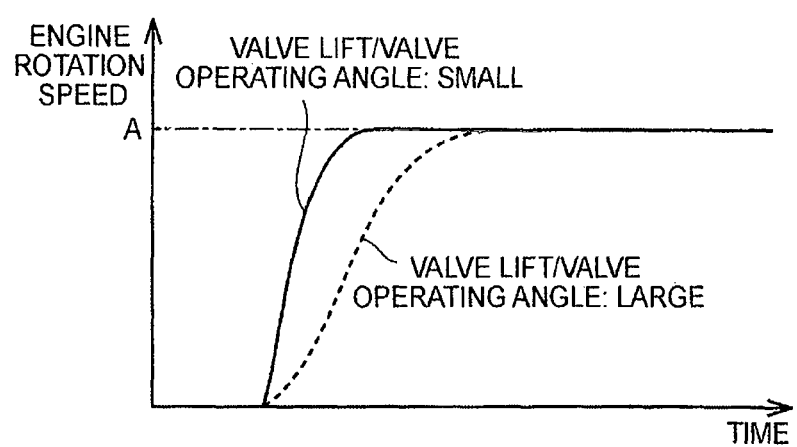
FIG. 8 is a time chart that illustrates a difference in the response of engine torque due to the characteristic of each intake valve.
Figure 9:
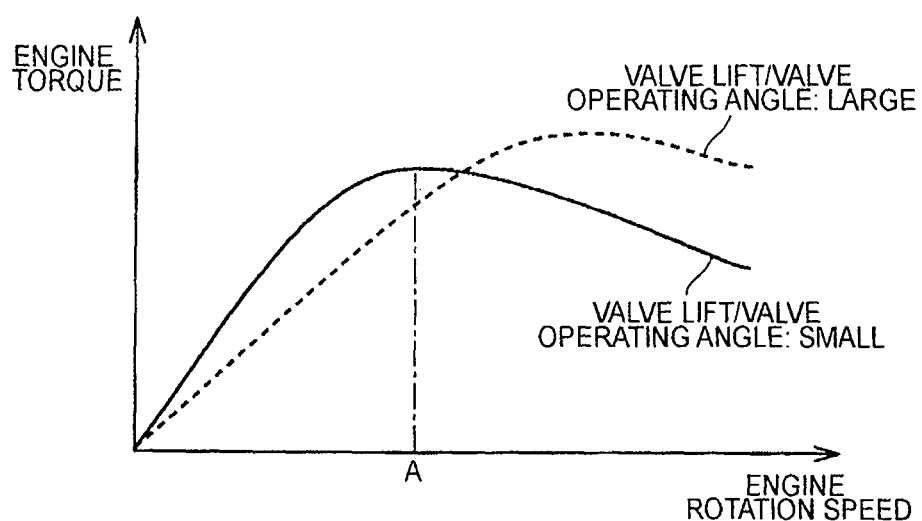
FIG. 9 is a graph that illustrates a difference in engine torque due to the characteristic of each intake valve.

FIG. 8 is a time chart that illustrates a difference in the response of engine torque due to the characteristic of each intake valve 118. In FIG. 8, the abscissa axis represents time, and the ordinate axis represents engine rotation speed. FIG. 9 is a graph that illustrates a difference in engine torque due to the characteristic of each intake valve 118. In FIG. 9, the abscissa axis represents engine rotation speed, and the ordinate axis represents engine torque. In FIG. 8 and FIG. 9, the continuous line indicates the case where the valve lift and the valve operating angle are small, and the dashed line indicates the case where the valve lift and the valve operating angle are large.

As shown in FIG. 8 and FIG. 9, in a region in which the engine rotation speed is low, an outputtable engine torque in the case where the valve lift and the valve operating angle are small is larger than the outputtable engine torque in the case where the valve lift and the valve operating angle are large. When the valve lift and the valve operating angle are large, part of air taken into each cylinder is returned to the outside of the cylinder. In contrast, when the valve lift and the valve operating angle are small, each intake valve 118 is early closed, so it is possible to introduce a larger amount of air, with the result that the outputtable torque of the engine 100 increases.

On the other hand, in a region in which the engine rotation speed is high, the outputtable engine torque in the case where the valve lift and the valve operating angle are large is larger than the outputtable engine torque in the case where the valve lift and the valve operating angle are small. This is because it is possible to introduce a larger amount of air by utilizing the inertial force of air in the case where the valve lift and the valve operating angle are large.

Thus, when the rotation speed of the engine 100 is increased to a predetermined value A that is a target rotation speed at engine start-up, an engine torque that is outputtable in a low rotation speed range is larger in the case where the valve lift and the valve operating angle are small, so it is possible to quickly increase the engine rotation speed.

In the above-described configuration, when the driving force of the engine 100 is required while the hybrid vehicle 1 travels in the EV mode, the engine 100 is started up while the hybrid vehicle 1 travels. When the engine 100 is started up while the hybrid vehicle 1 travels at a low vehicle speed, it is important to suppress vibrations resulting from the engine start-up in order to improve ride comfort. Therefore, it is conceivable to start up the engine 100 while the valve lift of each intake valve 118 is increased.

On the other hand, when the engine 100 is started up while the hybrid vehicle 1 travels at a high vehicle speed, it may be required to immediately output the driving force of the engine 100 in order to ensure running performance. However, if the valve lift of each intake valve 118 is increased in order to suppress vibrations, the response of torque that is generated by the engine 100 decreases, with the result that there is a possibility that it is not possible to immediately output engine torque.

In the present embodiment, when start-up of the engine 100 is required while the hybrid vehicle 1 travels in the EV mode, and when the speed of the hybrid vehicle 1 is high, intake valve control is executed. In the intake valve control, the VVL device 400 is controlled such that at least one of the valve lift and valve operating angle of each intake valve 118 in the case where the speed of the hybrid vehicle 1 is high is smaller than the corresponding at least one of the valve lift and valve operating angle of each intake valve 118 in the case where the speed of the hybrid vehicle 1 is low. Hereinafter, the details of the intake valve control will be described.

Figure 10:
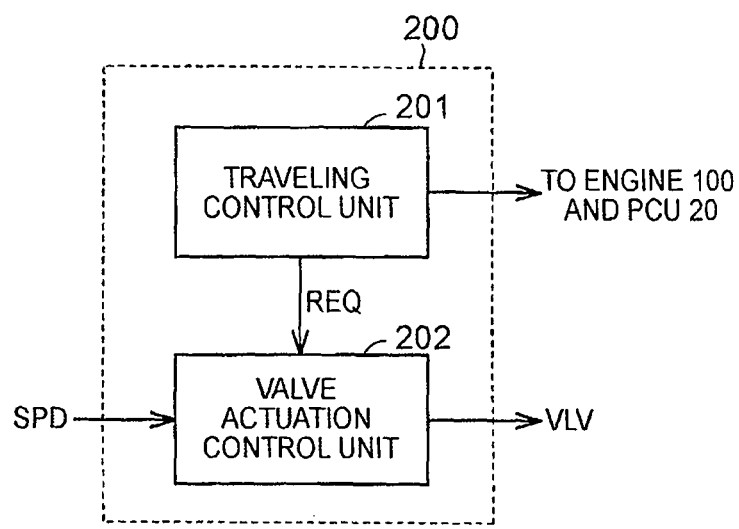
FIG. 10 is a functional block diagram associated with intake valve control that is executed by the controller shown in FIG. 1.

FIG. 10 is a functional block diagram associated with intake valve control that is executed by the controller 200 shown in FIG. 1. The functional blocks shown in the functional block diagram of FIG. 10 are implemented by the controller 200 executing hardware processing or software processing.

As shown in FIG. 2 together with FIG. 10, the controller 200 includes a traveling control unit 201 and a valve actuation control unit 202.

The traveling control unit 201 calculates a traveling power on the basis of an accelerator operation amount and a traveling state, and shifts the drive mode of the vehicle on the basis of the result of comparison between the calculated traveling power and a shift threshold. The traveling control unit 201 sets the drive mode to the EV mode when the calculated traveling power is lower than the shift threshold, and executes traveling control for traveling by using the driving force of the motor generator MG2 while stopping the engine 100. On the other hand, the traveling control unit 201 sets the drive mode to the HV mode when the calculated traveling power is higher than or equal to the shift threshold, and executes traveling control for traveling in a state where the engine 100 is operated.

The traveling control unit 201 requires the engine 100 to start up when the drive mode shifts from the EV mode to the HV mode. The traveling control unit 201 outputs a signal REQ to the valve actuation control unit 202. The signal REQ indicates that start-up of the engine 100 is required.

The valve actuation control unit 202 receives the signal SPD from the vehicle speed sensor 308. The valve actuation control unit 202 receives the signal REQ from the traveling control unit 201. When start-up of the engine 100 is required while the hybrid vehicle 1 travels in the EV mode, the valve actuation control unit 202 controls the WL device 400 such that at least one of the valve lift and valve operating angle of each intake valve 118 when the speed of the hybrid vehicle 1 is high is smaller than the corresponding at least one of the valve lift and valve operating angle of each intake valve 118 when the speed of the hybrid vehicle 1 is low.

Specifically, the valve actuation control unit 202 controls the VVL device 400 in the following manner. The valve lift and valve operating angle of each intake valve 118 are reduced when the vehicle speed at the time when start-up of the engine 100 is required is higher than or equal to a predetermined value X. The valve lift and valve operating angle of each intake valve 118 are increased when the vehicle speed at the time when start-up of the engine 100 is required is lower than the predetermined value X. As an example, the valve actuation control unit 202 may control the VVL device 400 in the following manner. The valve lift and valve operating angle of each intake valve 118 are minimized when the vehicle speed at the time when start-up of the engine 100 is required is higher than or equal to the predetermined value X. The valve lift and valve operating angle of each intake valve 118 are maximized when the vehicle speed at the time when start-up of the engine 100 is required is lower than the predetermined value X.

The valve actuation control unit 202 generates a signal VLV for controlling the VVL device 400, and outputs the generated signal VLV to the VVL device 400. The predetermined value X is a value for determining which is given a higher priority, suppression of engine vibrations or torque response, at start-up of the engine 100. That is, torque response is given a higher priority when the vehicle speed is higher than or equal to the predetermined value X, whereas suppression of engine vibrations is given a higher priority when the vehicle speed is lower than the predetermined value X.

Figure 11:
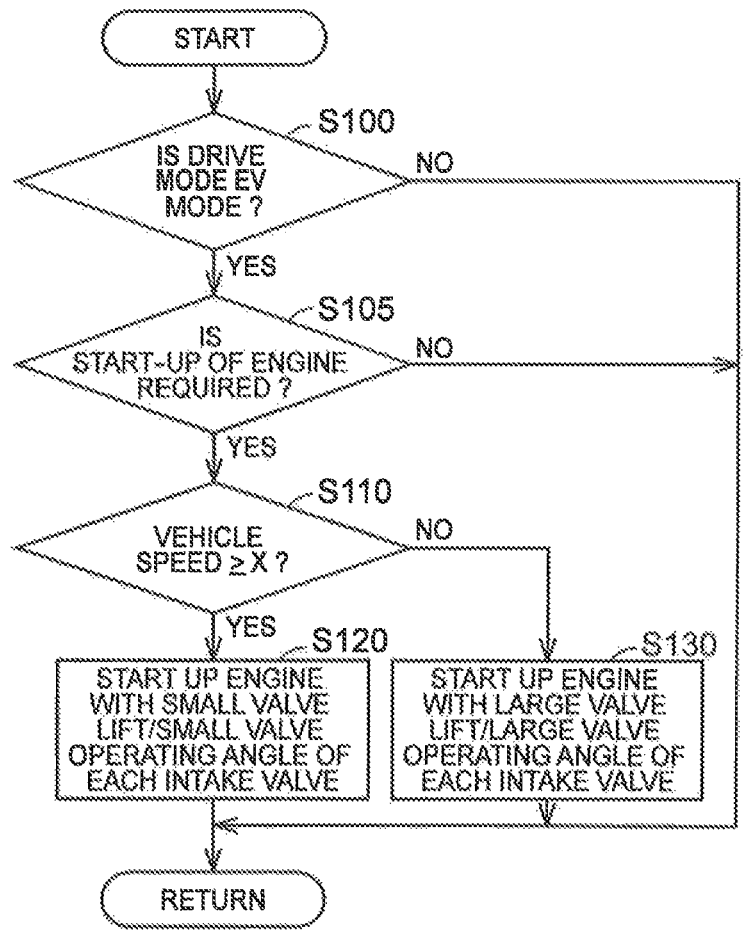
FIG. 11 is a flowchart that shows the control structure of intake valve control that is executed by the controller shown in FIG. 1.

FIG. 11 is a flowchart that shows the control structure of intake valve control that is executed by the controller 200 shown in FIG. 1. The flowchart shown in FIG. 11 is implemented by executing a program, prestored in the controller 200, at predetermined intervals. Alternatively, the processes of part of the steps may be implemented by constructing exclusive hardware (electronic circuit).

As shown in FIG. 11, the controller 200 determines in step (hereinafter, step is abbreviated as "S") 100 whether the drive mode is the EV mode. When it is determined that the drive mode is not the EV mode (NO in S100), the following processes are skipped, and the process returns to a main routine.

When it is determined that the drive mode is the EV mode (YES in S100), the controller 200 determines whether start-up of the engine 100 is required (S105). When it is determined that start-up of the engine 100 is not required (NO in S105), the following processes are skipped, and the process returns to the main routine.

When it is determined that start-up of the engine 100 is required (YES in S105), the controller 200 determines whether the speed of the hybrid vehicle 1 is higher than or equal to the predetermined value X (S110). When it is determined that the speed of the hybrid vehicle 1 is higher than or equal to the predetermined value X (YES in S110), the controller 200 starts up the engine 100 while the valve lift and valve operating angle of each intake valve 118 are reduced (S120). As an example, when the speed of the hybrid vehicle 1 is higher than or equal to the predetermined value X, the controller 200 may start up the engine 100 while the valve lift and valve operating angle of each intake valve 118 are minimized.

On the other hand, when it is determined that the speed of the hybrid vehicle 1 is lower than the predetermined value X (NO in S110), the controller 200 starts up the engine 100 while the valve lift and valve operating angle of each intake valve 118 are increased (S130). As an example, when the speed of the hybrid vehicle 1 is lower than the predetermined value X, the controller 200 may start up the engine 100 while the valve lift and valve operating angle of each intake valve 118 are maximized.

As described above, in this embodiment, the VVL device 400 is controlled in the following manner. When start-up of the engine 100 is required while the hybrid vehicle 1 travels in the EV mode, at least one of the valve lift and valve operating angle of each intake valve 118 when the hybrid vehicle 1 travels at a first vehicle speed is set so as to be smaller than the corresponding at least one of the valve lift and valve operating angle of each intake valve 118 when the hybrid vehicle 1 travels at a second vehicle speed lower than the first vehicle speed. When the speed of the hybrid vehicle 1 is high, in order to ensure running performance, the response of engine torque is required rather than suppression of vibrations. Therefore, when the speed of the hybrid vehicle 1 is high, the response of engine torque increases as a result of a reduction in at least one of the valve lift and the valve operating angle, with the result that it is possible to immediately output engine torque. On the other hand, when the speed of the hybrid vehicle 1 is low, in order to improve ride comfort, suppression of vibrations is required rather than the response of engine torque. Therefore, when the speed of the hybrid vehicle 1 is low, decompression occurs as a result of an increase in at least one of the valve lift and the valve operating angle, so it is possible to suppress vibrations resulting from engine start-up. Thus, according to this embodiment, it is possible to achieve appropriate engine start-up on the basis of the traveling condition.

In this embodiment, when start-up of the engine 100 is required while the hybrid vehicle 1 travels in the EV mode, the engine 100 may be started up in a state where the VVL device 400 is controlled such that at least one of the valve lift and valve operating angle of each intake valve 118 is set on the basis of the speed of the hybrid vehicle 1. In this case as well, it is possible to achieve appropriate engine start-up on the basis of the traveling condition as in the case of the above.

In this embodiment, when start-up of the engine 100 is required while the hybrid vehicle 1 travels in the EV mode, the VVL device 400 may be controlled such that at least one of the valve lift and valve operating angle of each intake valve 118 decreases as the speed of the hybrid vehicle 1 increases. In other words, the VVL device 400 may be controlled such that at least one of the valve lift and valve operating angle of each intake valve 118 monotonously decreases as the speed of the hybrid vehicle 1 increases. At this time, it is possible to ensure the response of torque as the vehicle speed increases and to suppress engine vibrations as the vehicle speed decreases.

The valve lift and valve operating angle of each intake valve 118 may be changed continuously (steplessly) or may be changed discretely (stepwisely).

Figure 12:
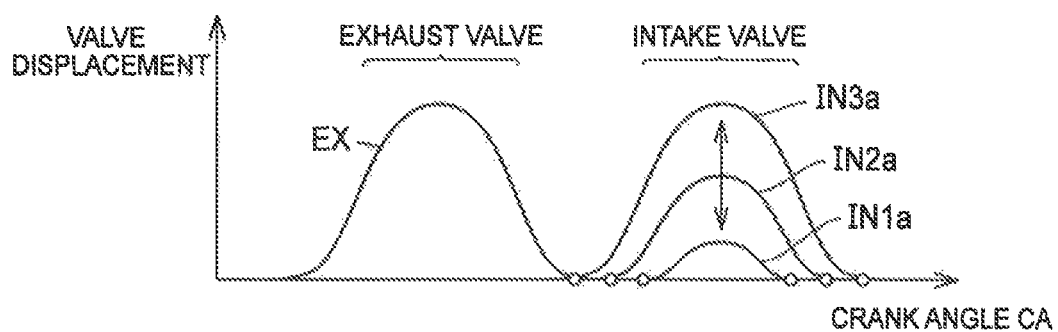
FIG. 12 is a graph that shows the correlation between a crank angle and a valve displacement that is achieved by a VVL device that is able to change the operation characteristic of each intake valve in three steps.

FIG. 12 is a graph that shows the correlation between a crank angle and a valve displacement that is achieved by a VVL device 400A that is able to change the operation characteristic of each intake valve 118 in three steps. The VVL device 400A is configured to be able to change the operation characteristic to any one of first to third characteristics. The first characteristic is indicated by a waveform IN1a. The second characteristic is indicated by a waveform IN2a. The valve lift and the valve operating angle in the second characteristic are larger than the valve lift and the valve operating angle in the first characteristic. The third characteristic is indicated by a waveform IN3a. The valve lift and the valve operating angle in the third characteristic are larger than the valve lift and the valve operating angle in the second characteristic.

Figure 13:
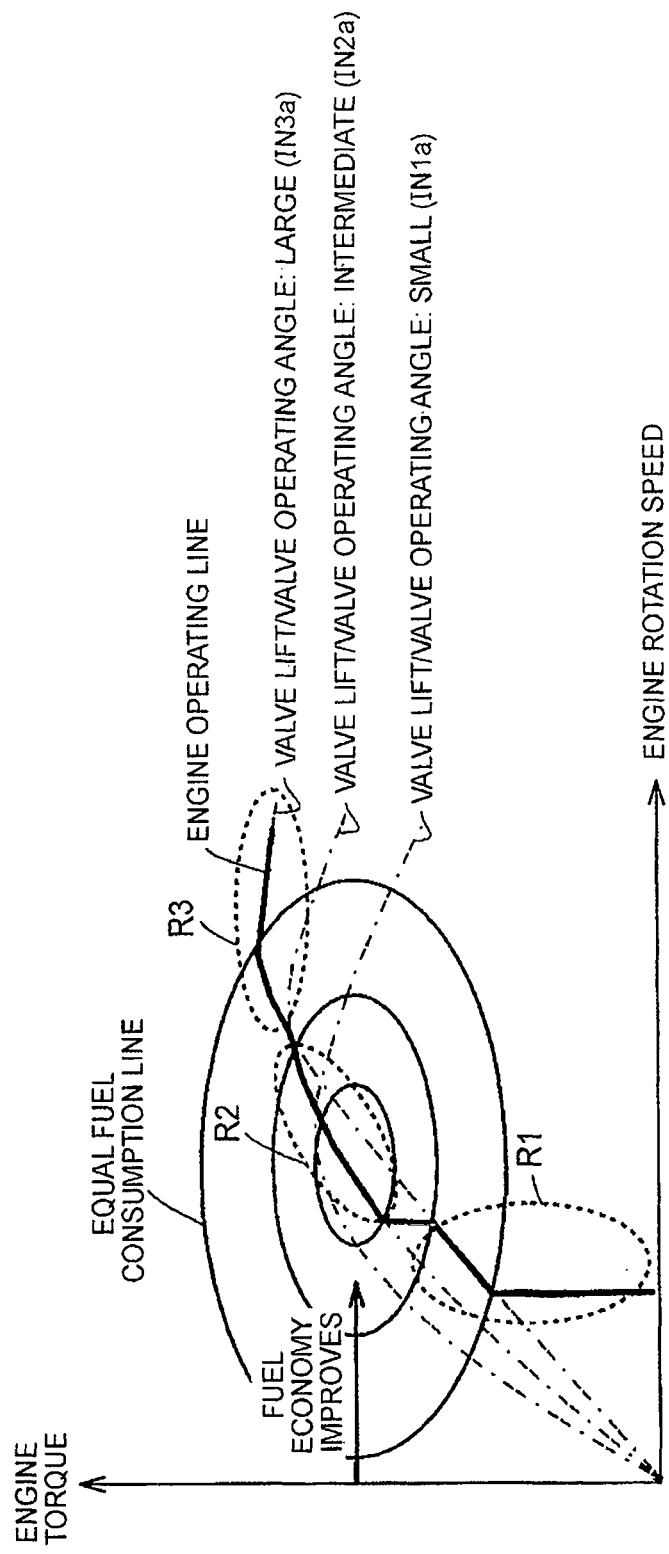
FIG. 13 is a graph that shows an operating line of an engine including the VVL device having the operation characteristics shown in FIG. 12.

FIG. 13 is a graph that shows an operating line of an engine 100A including the VVL device 400A having the operation characteristics shown in FIG. 12. In FIG. 13, the abscissa axis represents engine rotation speed, and the ordinate axis represents engine torque. The alternate long and short dashed lines in FIG. 13 indicate torque characteristics corresponding to the first to third characteristics (IN1a to IN3a). The circles indicated by the continuous line in FIG. 13 indicate equal fuel consumption lines. Each equal fuel consumption line is a line connecting points at which a fuel consumption amount is equal. The fuel economy improves as approaching the center of the circles. The engine 100A is basically operated along the engine operating line indicated by the continuous line in FIG. 13.

In a low rotation speed region indicated by the region R1, it is important to reduce shock at engine start-up. In addition, introduction of exhaust gas recirculation (EGR) gas is stopped, and fuel economy is improved by using the Atkinson cycle. The third characteristic (IN3a) is selected as the operation characteristic of each intake valve 118 so that the valve lift and the valve operating angle increase. In an intermediate rotation speed region indicated by the region R2, fuel economy is improved by increasing the amount of introduction of EGR gas. Thus, the second characteristic (IN2a) is selected as the operation characteristic of the intake valve 118 so that the valve lift and the valve operating angle are intermediate.

That is, when the valve lift and valve operating angle of each intake valve 118 are large (third characteristic), improvement in fuel economy by using the Atkinson cycle is given a higher priority than improvement in fuel economy by introduction of EGR gas. On the other hand, when the intermediate valve lift and valve operating angle are selected (second characteristic), improvement in fuel economy by introduction of EGR gas is given a higher priority than improvement in fuel economy by using the Atkinson cycle.

In a high rotation speed region indicated by the region R3, a large amount of air is introduced into each cylinder by the inertia of intake air, and the output performance is improved by increasing an actual compression ratio. Thus, the third characteristic (IN3a) is selected as the operation characteristic of each intake valve 118 so that the valve lift and the valve operating angle increase.

When the engine 100A is operated at a high load in the low rotation speed region, when the engine 100A is started up at an extremely low temperature or when a catalyst is warmed up, the first characteristic (IN1a) is selected as the operation characteristic of each intake valve 118 so that the valve lift and the valve operating angle decrease. In this way, the valve lift and the valve operating angle are determined on the basis of the operating state of the engine 100A.

Figure 14:
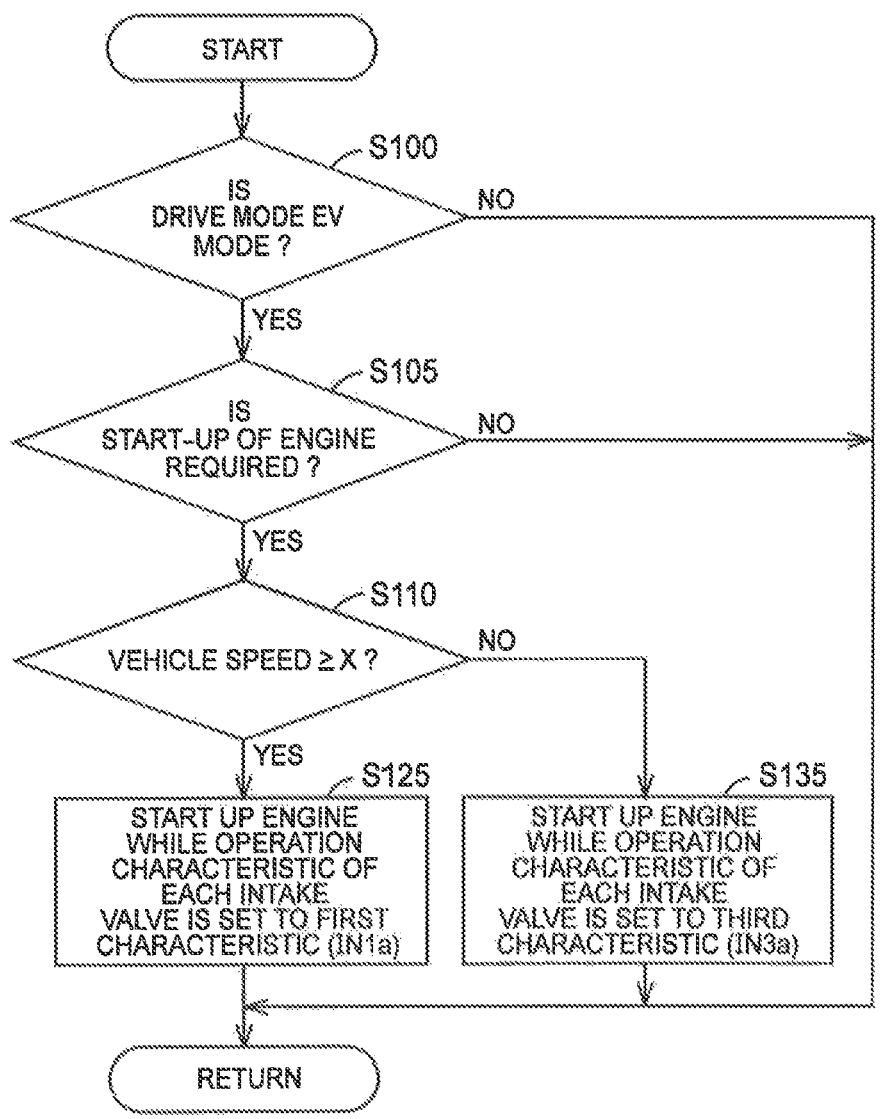
FIG. 14 is a flowchart that shows the control structure of intake valve control that is executed by the controller that controls the VVL device having the operation characteristics shown in FIG. 12.

FIG. 14 is a flowchart that shows the control structure of intake valve control that is executed by a controller 200A that controls the VVL device 400A having the operation characteristic shown in FIG. 12. As shown in FIG. 14, S100 to S110 are similar to those in the flowchart of FIG. 11, so the description will not be repeated.

When it is determined in S110 that the speed of the hybrid vehicle 1 is higher than or equal to the predetermined value X (YES in S110), the controller 200A controls the VVL device 400A such that the operation characteristic of each intake valve 118 is set to the first characteristic (IN1a) (S125).

On the other hand, when it is determined that the speed of the hybrid vehicle 1 is lower than the predetermined value X (NO in S110), the controller 200A controls the VVL device 400A such that the operation characteristic of each intake valve 118 is set to the third characteristic (IN3a) (S135).

With such a configuration, because the operation characteristic, that is, the valve lift and valve operating angle, of each intake valve 118 is limited to three characteristics, it is possible to reduce a time that is required to adapt control parameters for controlling the operating state of the engine 100A in comparison with the case where the valve lift and valve operating angle of each intake valve 118 continuously change. In addition, it is possible to reduce torque that is required of the actuator for changing the valve lift and valve operating angle of each intake valve 118, so it is possible to reduce the size and weight of the actuator. Therefore, it is possible to reduce the manufacturing cost of the actuator.

Figure 15:
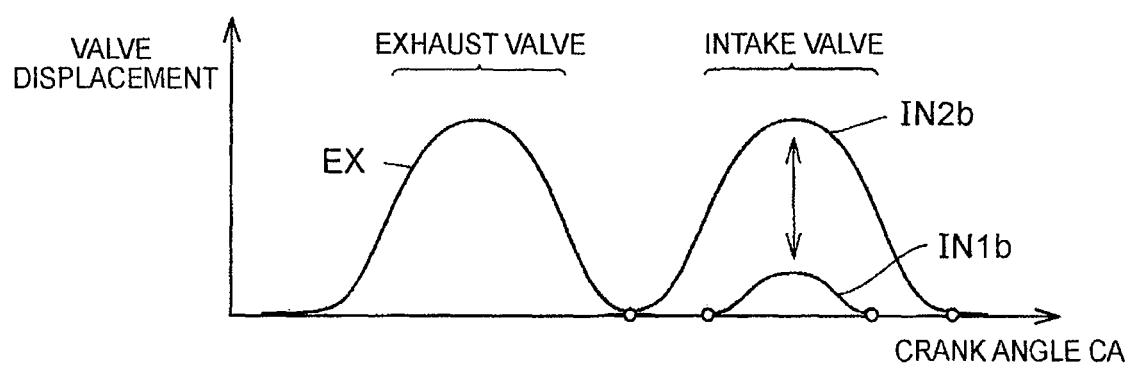
FIG. 15 is a graph that shows the correlation between a crank angle and a valve displacement that is achieved by a VVL device that is able to change the operation characteristic of each intake valve in two steps.

FIG. 15 is a graph that shows the correlation between a crank angle and a valve displacement that is achieved by a VVL device 400B that is able to change the operation characteristic of each intake valve 118 in two steps. The VVL device 400B is configured to be able to change the operation characteristic to one of the first and second characteristics. The first characteristic is indicated by a waveform In1b. The second characteristic is indicated by a waveform IN2b. The valve lift and the valve operating angle in the second characteristic are larger than the valve lift and the valve operating angle in the first characteristic.

At this time, when the vehicle speed at the time when start-up of the engine 100 is required is higher than or equal to the predetermined value X, the VVL device 400B is controlled such that the operation characteristic of each intake valve 118 is set to the first characteristic. When the vehicle speed at the time when start-up of the engine 100 is required is lower than the predetermined value X, the VVL device 400B is controlled such that the operation characteristic of each intake valve 118 is set to the second characteristic.

With such a configuration, because the operation characteristic, that is, the valve lift and the valve operating angle, of each intake valve 118 is limited to two characteristics, it is possible to further reduce a time that is required to adapt control parameters for controlling the operating state of the engine 100. In addition, it is possible to further simplify the configuration of the actuator. The operation characteristic, that is, the valve lift and the valve operating angle, of each intake valve 118 is not limited to the case where the operation characteristic is changed in two steps or in three steps. The operation characteristic may be changed in any number of steps larger than or equal to four steps.

In the above-described embodiments, the valve operating angle of each intake valve 118 is changed together with the valve lift of each intake valve 118. However, the invention is also applicable to an actuator that is able to change only the valve lift of each intake valve 118 or an actuator that is able to change only the valve operating angle of each intake valve 118. With the actuator that is able to change one of the valve lift and valve operating angle of each intake valve 118 as well, it is possible to obtain similar advantageous effects to those of the case where it is possible to change both the valve lift and valve operating angle of each intake valve 118. The actuator that is able to change one of the valve lift and valve operating angle of each intake valve 118 may be implemented by utilizing a known technique.

In the above-described embodiments, the series-parallel hybrid vehicle that is able to transmit the power of the engine 100 by distributing the power of the engine 100 to the drive wheels 6 and the motor generators MG1, MG2 by the power split device 4. The invention is also applicable to a hybrid vehicle of another type. That is, the invention is also applicable to, for example, a so-called series hybrid vehicle in which the engine 100 is only used to drive the motor generator MG1 and the driving force of the vehicle is generated by only the motor generator MG2, a hybrid vehicle in which only regenerative energy within kinetic energy generated by the engine 100 is recovered as electric energy, a motor-assist hybrid vehicle in which the engine is used as a main power source and a motor, where necessary, assists, or the like. The invention is also applicable to a hybrid vehicle that travels by using the power of only the engine while the motor is separated.

In the above description, the engine 100 corresponds to one example of an "internal combustion engine" according to the invention, and the motor generator MG2 corresponds to one example of a "rotary electric machine" according to the invention. The VVL device 400 corresponds to one example of a "variable valve actuating device" according to the invention.

The embodiments described above should be regarded as only illustrative in every respect and not restrictive. The scope of the invention is defined by the appended claims rather than the description of the above embodiments. The scope of the invention is intended to encompass all modifications within the scope of the appended claims and equivalents thereof.

The invention claimed is:

1. A controller for a hybrid vehicle, the hybrid vehicle including an internal combustion engine and a rotary electric machine, the internal combustion engine including a variable valve actuating device configured to change an operation characteristic of an intake valve, the rotary electric machine being configured to generate driving force for propelling the hybrid vehicle, the controller comprising:

a traveling control unit configured to execute traveling control for causing the hybrid vehicle to travel by using the driving force of the rotary electric machine while stopping the internal combustion engine, the traveling control unit being configured to start up the internal combustion engine while executing the traveling control; and a valve actuation control unit configured to control the variable valve actuating device, the valve actuation control unit being configured to, when the internal combustion engine is started up while the traveling control is executed, set at least one of a valve lift and valve operating angle of the intake valve such that the at least one of the valve lift and valve operating angle of the intake valve when the hybrid vehicle travels at a first vehicle speed is smaller than the corresponding at least one of the valve lift and valve operating angle of the intake valve when the hybrid vehicle travels at a second vehicle speed, the second vehicle speed being lower than the first vehicle speed.

2. The controller according to claim 1, wherein
when start-up of the internal combustion engine is required while the traveling control is executed, the valve actuation control unit is configured to set at least one of the valve lift of the intake valve and the valve operating angle of the intake valve such that the at least one of the valve lift of the intake valve and the valve operating angle of the intake valve when the hybrid vehicle travels at the first vehicle speed is smaller than the corresponding at least one of the valve lift of the intake valve and the valve operating angle of the intake valve when the hybrid vehicle travels at the second vehicle speed, and
the traveling control unit is configured to start up the internal combustion engine.

3. The controller according to claim 1, wherein
the variable valve actuating device is configured to change the operation characteristic of the intake valve to one of a first characteristic and a second characteristic,
the valve actuation control unit is configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value,
the valve actuation control unit is configured to set the operation characteristic of the intake valve to the second characteristic when start-up of the internal combustion engine is required while the traveling control is executed and when the speed of the hybrid vehicle at the time when start-up of the internal combustion engine is required is lower than the predetermined value,
the traveling control unit is configured to start up the internal combustion engine when start-up of the internal combustion engine is required while the traveling control is executed, and
at least one of the valve lift and the valve operating angle of the second characteristic is larger than the corresponding at least one of the valve lift and the valve operating angle of the first characteristic.

4. The controller according to claim 1, wherein
the variable valve actuating device is configured to change the operation characteristic of the intake valve to any one of a first characteristic, a second characteristic and a third characteristic,
the valve actuation control unit is configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value,
the valve actuation control unit is configured to set the operation characteristic of the intake valve to the third characteristic when start-up of the internal combustion engine is required while the traveling control is executed and when the speed of the hybrid vehicle at the time when start-up of the internal combustion engine is required is lower than the predetermined value,
the traveling control unit is configured to start up the internal combustion engine when start-up of the internal combustion engine is required while the traveling control is executed,
at least one of the valve lift and the valve operating angle of the second characteristic is larger than the corresponding at least one of the valve lift and the valve operating angle of the first characteristic, and
at least one of the valve lift and the valve operating angle of the third characteristic is larger than the corresponding at least one of the valve lift and the valve operating angle of the second characteristic.

5. The controller according to claim 1, wherein
when start-up of the internal combustion engine is required while the traveling control is executed, the valve actuation control unit is configured to reduce at least one of the valve lift and valve operating angle of the intake valve as a speed of the hybrid vehicle increases, and
the traveling control unit is configured to start up the internal combustion engine when start-up of the internal combustion engine is required while the traveling control is executed.

6. A control method for a hybrid vehicle, the hybrid vehicle including an internal combustion engine, a rotary electric machine, and a controller, the internal combustion engine including a variable valve actuating device configured to change an operation characteristic of an intake valve, the rotary electric machine being configured to generate driving force for propelling the hybrid vehicle, the control method comprising:
(a) executing traveling control by the controller, the traveling control being control for causing the hybrid vehicle to travel by using the driving force of the rotary electric machine while stopping the internal combustion engine;
(b) when the internal combustion engine is started up while the traveling control is executed, setting, by the controller, at least one of a valve lift and valve operating angle of the intake valve such that the at least one of the valve lift and valve operating angle of the intake valve when the hybrid vehicle travels at a first vehicle speed is smaller than the corresponding at least one of the valve lift and valve operating angle of the intake valve when the hybrid vehicle travels at a second vehicle speed, the second vehicle speed being lower than the first vehicle speed; and
(c) starting the internal combustion engine by the controller when start-up of the internal combustion engine is required while the traveling control is executed.

7. A hybrid vehicle comprising:
an internal combustion engine including a variable valve actuating device configured to change an operation characteristic of an intake valve;
a rotary electric machine configured to generate driving force for propelling the hybrid vehicle; and
a controller configured to:
(a) execute traveling control for causing the hybrid vehicle to travel by using the driving force of the rotary electric machine while stopping the internal combustion engine, (b) control the variable valve actuating device, and (c) when the internal combustion engine is started up while the traveling control is executed, set at least one of a valve lift and valve operating angle of the intake valve such that the at least one of the valve lift and valve operating angle of the intake valve when the hybrid vehicle travels at a first vehicle speed is smaller than the corresponding at least one of the valve lift and valve operating angle of the intake valve when the hybrid vehicle travels at a second vehicle speed, the second vehicle speed being lower than the first vehicle speed, and start up the internal combustion engine.

8. The hybrid vehicle according to claim 7, wherein, when start-up of the internal combustion engine is required while the traveling control is executed, the controller is configured to set at least one of the valve lift of the intake valve and the valve operating angle of the intake valve such that the at least one of the valve lift of the intake valve and the valve operating angle of the intake valve when the hybrid vehicle travels at the first vehicle speed is smaller than the corresponding at least one of the valve lift of the intake valve and the valve operating angle of the intake valve when the hybrid vehicle travels at the second vehicle speed, and start up the internal combustion engine.

9. The hybrid vehicle according to claim 8, wherein the variable valve actuating device is configured to change the operation characteristic of the intake valve to one of a first characteristic and a second characteristic, the controller is configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value, the controller is configured to set the operation characteristic of the intake valve to the second characteristic when start-up of the internal combustion engine is required while the traveling control is executed and when the speed of the hybrid vehicle at the time when start-up of the internal combustion engine is required is lower than the predetermined value, the controller is configured to start up the internal combustion engine when start-up of the internal combustion engine is required while the traveling control is executed, and at least one of the valve lift and the valve operating angle of the second characteristic is larger than the corresponding at least one of the valve lift and the valve operating angle of the first characteristic.

10. The hybrid vehicle according to claim 8, wherein the variable valve actuating device is configured to change the operation characteristic of the intake valve to any one of a first characteristic, a second characteristic and a third characteristic, the controller is configured to set the operation characteristic of the intake valve to the first characteristic when start-up of the internal combustion engine is required while the traveling control is executed and when a speed of the hybrid vehicle at the time when start-up of the internal combustion engine is required is higher than or equal to a predetermined value, the controller is configured to set the operation characteristic of the intake valve to the third characteristic when start-up of the internal combustion engine is required while the traveling control is executed and when the speed of the hybrid vehicle at the time when start-up of the internal combustion engine is required is lower than the predetermined value, the controller is configured to start up the internal combustion engine when start-up of the internal combustion engine is required while the traveling control is executed, at least one of the valve lift and the valve operating angle of the second characteristic is larger than the corresponding at least one of the valve lift and the valve operating angle of the first characteristic, and at least one of the valve lift and the valve operating angle of the third characteristic is larger than the corresponding at least one of the valve lift and the valve operating angle of the second characteristic.

11. The hybrid vehicle according to claim 8, wherein when start-up of the internal combustion engine is required while the traveling control is being executed, the controller is configured to reduce at least one of the valve lift and valve operating angle of the intake valve as a speed of the hybrid vehicle increases, and the controller is configured to start up the internal combustion engine when start-up of the internal combustion engine is required while the traveling control is executed.

* * * * *